April 21, 1936.  A. L. BOSENCE ET AL  2,038,472
TAPER GAUGE
Filed July 20, 1932   2 Sheets-Sheet 1
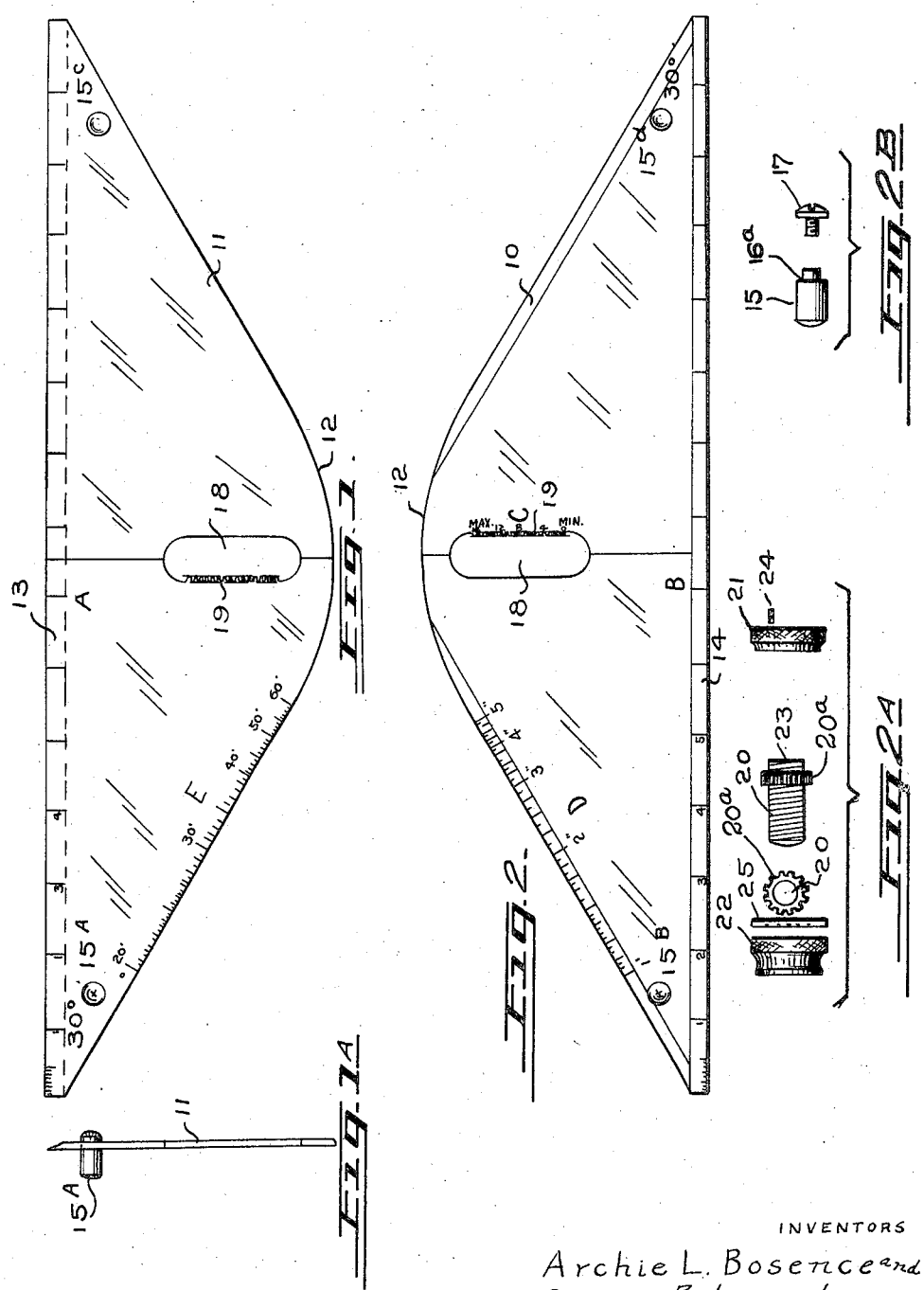
INVENTORS
Archie L. Bosence and
George B. Ingraham,
By Ralph Burch
Attorney

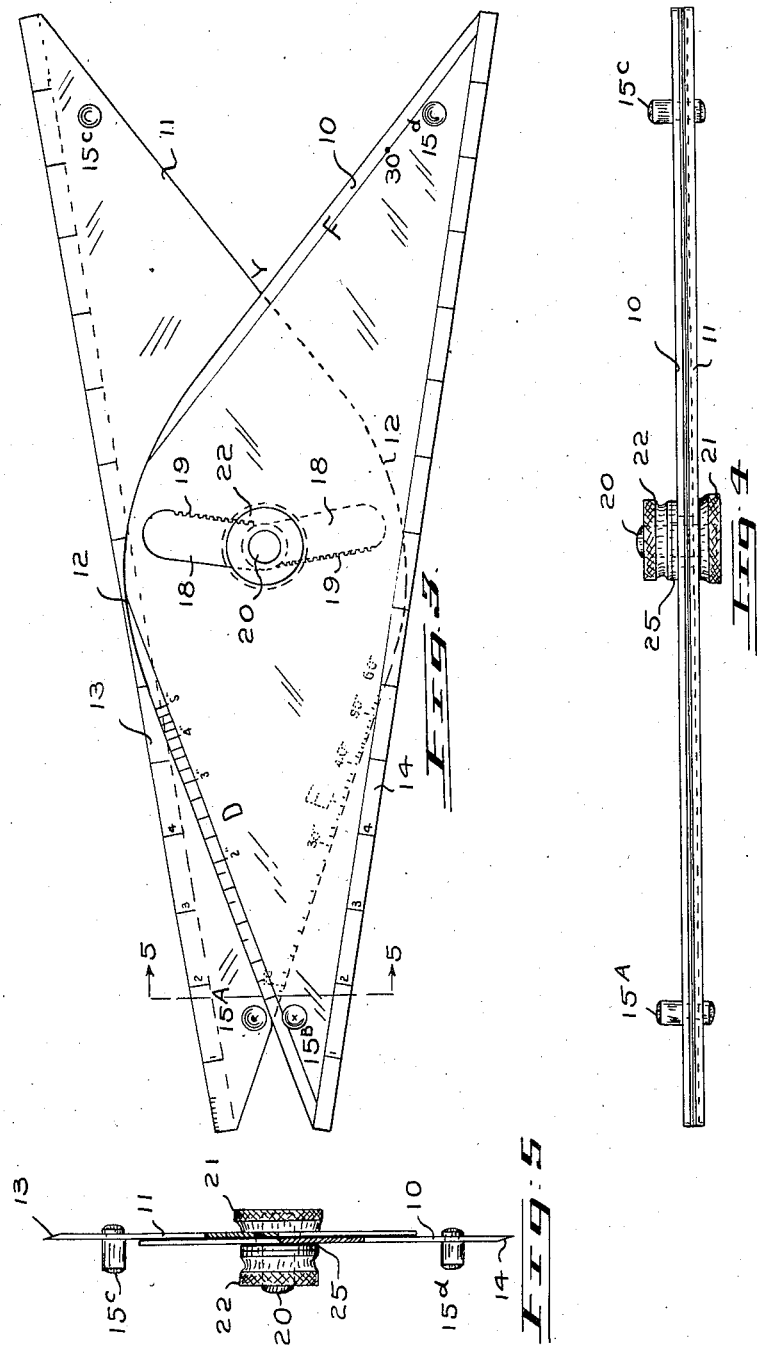

Patented Apr. 21, 1936

2,038,472

UNITED STATES PATENT OFFICE 2,038,472

TAPER GAUGE

Archie L. Bosence and George B. Ingraham,
West St. John, New Brunswick, Canada

Application July 20, 1932, Serial No. 623,652

1 Claim. (Cl. 33—102)

This invention relates to improvements in the design and construction of a taper gauge and more particularly to a taper gauge designed for measuring the female part of a taper, the primary object being to provide a type of gauge especially adapted to measure the amount of taper in its relationship to a definite linear length of the slant height or taper side.

A further object is to provide a gauge having means for varying the diameter of the gauge and for maintaining any intermediate adjustment between the major and minor diameters of the gauge.

Still further objects are to provide a gauge adapted to accurately measure worn taper fits that would otherwise require the trial and error method, such as ships' rudder pintles, turbine taper fits and the like, and to provide a gauge having a varying diameter, the centre of which is always on the longitudinal centre line of gauge, thus maintaining the sides and side scales in equidistant relationship.

With these and other objects in view, as will appear as the description proceeds, the invention consists in the design, construction and arrangement of parts as hereinafter more specifically set forth, claimed, and shown in the accompanying drawings forming a part of this present application and in which:

Fig. 1 shows the design and construction of the lower plate member.

Fig. 1A is an end view of Fig. 1.

Fig. 2 shows the design and construction of the upper plate member.

Fig. 2A is a view of the adjusting bolt with the parts thereof in separate relation, Fig. 2B is a view of one of the studs, with the parts thereof in separate relation.

Fig. 3 shows the gauge assembly.

Fig. 4 is a side view of Fig. 3.

Fig. 5 is an end view taken on the lines 5—5 of Fig. 3.

Referring more in detail to the accompanying drawings in which similar characters represent corresponding parts throughout the several views, it will be seen that the gauge consists of upper and lower symmetrical triangular plate members 10 and 11, respectively. The inner edges of the plates are disposed 30 degrees angularly to the outer edges, the inner apex of the 120 degree angle being formed into the arc as shown at 12.

The lower plate 11 is provided with the bevel 13 on the under side thereof while the upper side is divided into the scale A, said scale being graduated to register true linear measurement.

The upper plate 10 is provided with the bevel 14 on the upper side thereof, the bevel face being divided into the scale B, said scale being identical to the scale A. Both plates are provided with similarly oriented studs 15, the studs on the under plate 11 being slightly longer than the studs on the upper plate 10 in order that the stud tops on both members may be in a plane parallel to the surface planes of the plates, as shown in Fig. 5. Each stud 15 is provided with the indented shoulder 16a, Fig. 2B which engages an aperture provided in the plate member, the stud being maintained in position by a threaded set screw 17 inserted from the under side of the plate. The orientation of the studs 15 of each plate is such that they are equidistant from the ends of the plates, and the distance longitudinally between their diametric centres is in this instance 12 inches. They are also mounted inwardly from the outer edges a specific distance, preferably one half inch so that a constant of one inch is established as a plussage for the gauge which must be added to the lateral readings taken from the scale D.

Both plate members are provided with the transversely adjustable centre comprising an elongated slot 18, said slot being provided with a suitably pitched rack 19, the rack in the upper plate being oppositely disposed to the rack in the lower plate. The distance from the outside of the plate member to the inner end of the rack must be such that the minor diameter of the gauge permits no over projection of the plate members.

For adjusting and maintaining the plates in position a threaded bolt 20 and gear 20a together with an adjusting nut 21 and clamping nut 22 are provided. The gear 20a is constructed integral with the bolt, see Fig. 2A at 20 and 20a, said gear 20a being peripherally provided with teeth relatively pitched to operably engage the teeth of the rack 19. The construction of the rack 19 and gear 20a is such as to eliminate back lash in such members thus providing accurate adjustment to the plate members.

The gear 20a is provided with the extension 23 which threadably engages the adjusting nut 21 on the under side of the lower plate. For purposes of clearance, the first thread of this nut is reamed out, while a small locking pin 24 secures together the extension 23 and the nut 21, thus the nut 21, when turned, actuates the gear, which, in turn, laterally adjusts the diameter of gauge.

The rack of the member 10 is provided with a scale C corresponding to the teeth of the rack. Thus any setting may be noted and recorded for future reference, by observing the number on the scale adjacent the peripheral edge of the washer 25, when the members 10 and 11 are set. Only one scale C is shown as the relative scale on plate 11 will be the same, reading from zero upwardly and from the outer edge inwardly.

For maintaining the plate members in adjustment, a suitable washer 25 having a counter bore provided therein on the underside to permit clearance to the gear 20a is dropped over the bolt and a threadably mounted clamping nut 22 turned to firmly secure the elements in position. The counter bore in the washer 25 is optional but is, as suggested, for clearance to the gear. The adjusting nut 21 may be of slightly larger diameter than the clamping nut 22, both nuts being provided with knurled gripping surfaces.

The plate 10 is provided with the scale D, said scale being graduated to indicate the lateral opening or width between the studs 15a and 15b as shown in Fig. 3.

The opening between the studs 15c and 15d corresponding to the opening between the studs 15a and 16b may be taken and recorded for future reference.

The plate 11 is provided with the degree scale E, said scale indicating the magnitude of the angle at X. It is here noted that the construction of the gauge makes the sum of the angles X+Y=120 degrees, therefore, the angle Y always=120−X, and since the point angles of taper drills seldom exceed 120 degrees, the angles X or Y will serve to measure such point angles. The scales D and E have been shown for the major diameter of the gauge reading 16 on the scale C as this setting will give the maximum gauge diameter. For other settings on scale C, the scales D and E would have to be graduated accordingly. It will be found that the scales D and E graduated for a maximum C reading on a few gauges of varying sizes will meet nearly all taper requirements.

All scales are to be accurately machine divided and legibly marked, it being understood that the scales may be divided in either English or metric systems.

The bevel on the under side of plate 11 and the flat under side of plate 10 are left free of markings in order that the surface may be chalked for scriber marking.

It is believed that the design, construction and arrangement of the invention are apparent from the foregoing paragraphs taken in conjunction with the accompanying drawings without further detailed description.

In operation, the ends of plates 10 and 11 are inserted in the taper to be measured and the plates adjusted by means of the nut 21 and gear 20a until the edges 13 and 14 of the plates align the taper sides. The lateral distance between studs 15a and 15b, denoted on scale D is recorded, likewise the distance between studs 15c and 15d is recorded. The slant length of the taper is indicated from the graduations on edges 13 and 14 of the plates. The studs 15a and 15c on plate 11, likewise studs 15b and 15d on plate 10, being 12 inches apart, give the per foot relationship of taper as expressed from the difference of the lateral distances between studs 15c and 15d, minus the distance between studs 15a and 15b.

While the preferred embodiment of the invention has been disclosed, it is understood that minor changes in the details of construction and arrangement of co-operating elements may be resorted to within the scope of what is claimed without departing from the spirit of the invention.

What we claim is:—

A taper gauge comprising two pivotally connected and laterally adjustable plate members, each of said plate members being of substantially triangular shape, and having their inner edges disposed 30 degrees angularly to their outer edges, the inner apex of the triangle being formed into an arc, one of said plates being provided with a bevel along its under edge and a graduated linear scale along the upper edge, the other plate being provided with a bevel along its upper edge, said bevelled edge being provided with a linear scale identical to the scale on the relative plate, the above said connection between the plate members comprising an elongated slot in each plate, each slot being provided with a suitably pitched rack and scale along one edge, the rack in the one plate being oppositely disposed to the rack in the other plate, means for laterally actuating the plates, and means for maintaining the plates in adjustment.

ARCHIE L. BOSENCE.
GEORGE B. INGRAHAM.